United States Patent [19]
Bowers et al.

[11] Patent Number: 6,103,984
[45] Date of Patent: Aug. 15, 2000

[54] VEHICLE INFLATABLE SIDE CURTAIN ASSEMBLY

[75] Inventors: Paul A. Bowers, Ray; Daniel R. Sutherland, East Pointe, both of Mich.

[73] Assignee: TRW Vehicle Safety Systems Inc., Lyndhurst, Ohio

[21] Appl. No.: 09/324,319

[22] Filed: Jun. 2, 1999

[51] Int. Cl.⁷ ............................................. B60R 21/22
[52] U.S. Cl. ........................................................ 200/730.2
[58] Field of Search ........................................ 280/730.2

[56] References Cited

U.S. PATENT DOCUMENTS

| | | | |
|---|---|---|---|
| 5,265,903 | 11/1993 | Kuretake et al. | 280/730.2 |
| 5,362,097 | 11/1994 | Barske | 280/730.2 |
| 5,454,588 | 10/1995 | Rose | 280/728.2 |
| 5,755,457 | 5/1998 | Specht | 280/728.2 |
| 5,791,680 | 8/1998 | Dyer | 280/728.3 |
| 5,791,683 | 8/1998 | Shibata et al. | 280/730.2 |
| 5,899,486 | 5/1999 | Ibe | 280/730.2 |
| 5,921,575 | 7/1999 | Kretschmer et al. | 280/730.2 |
| 5,957,487 | 9/1999 | Stütz | 280/730.2 |

*Primary Examiner*—Kenneth R. Rice
*Attorney, Agent, or Firm*—Tarolli, Sundheim, Covell, Tummino & Szabo L.L.P.

[57] ABSTRACT

A vehicle occupant safety apparatus (10) for helping to protect an occupant of a vehicle (12) having a roof (40) and a side structure (20) includes an inflatable device (120) having a deflated condition and having a condition inflated between the occupant and the vehicle side structure. The apparatus (10) also comprises a one-piece extruded cover (70) for mounting in the vehicle (12) in a position extending along the vehicle between the roof (40) and side structure (20). The cover (70) includes a diffuser chamber (108) extending along the length of the cover for receiving inflation fluid to inflate the inflatable device (120). The cover (70) includes an inflatable device chamber (140) extending parallel to the diffuser chamber (108) along the length of the cover. The inflatable device chamber (140) receives the inflatable device (120) in a deflated condition. The cover (70) has a plurality of diffuser openings (110) spaced along the length of the diffuser chamber (108) and establishing fluid communication between the diffuser chamber and the inflatable device chamber (140) when the inflatable device (120) is in the deflated condition.

12 Claims, 4 Drawing Sheets

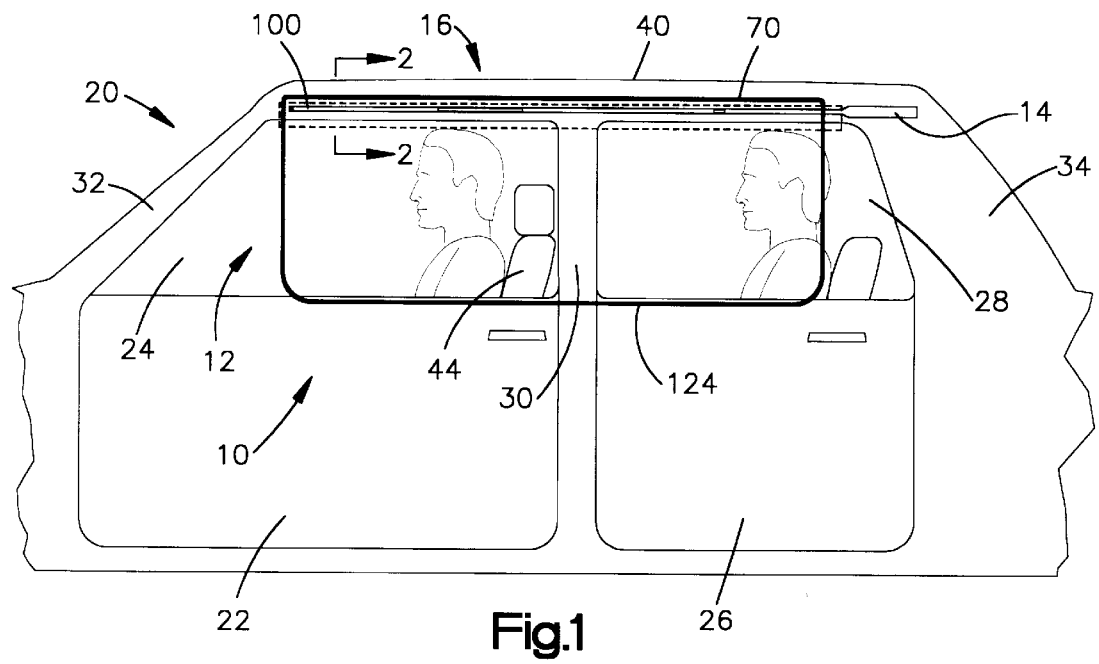
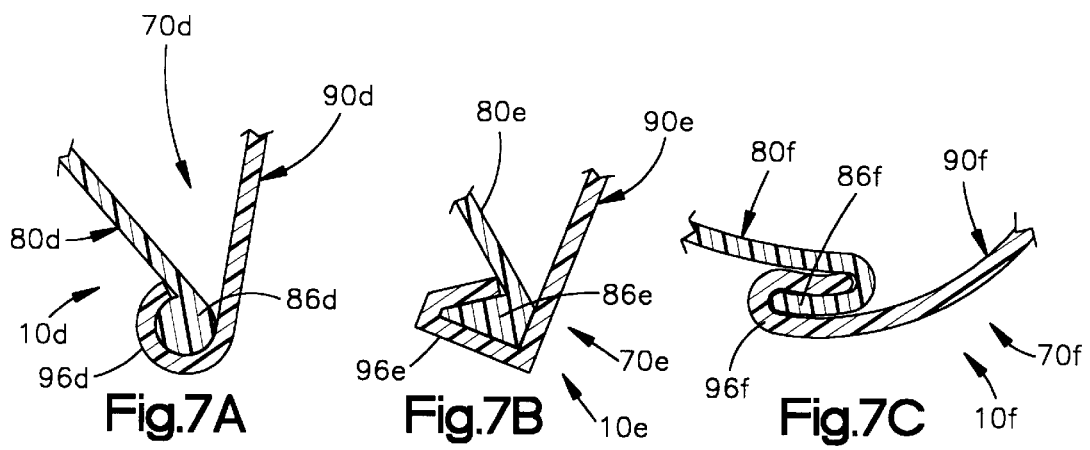
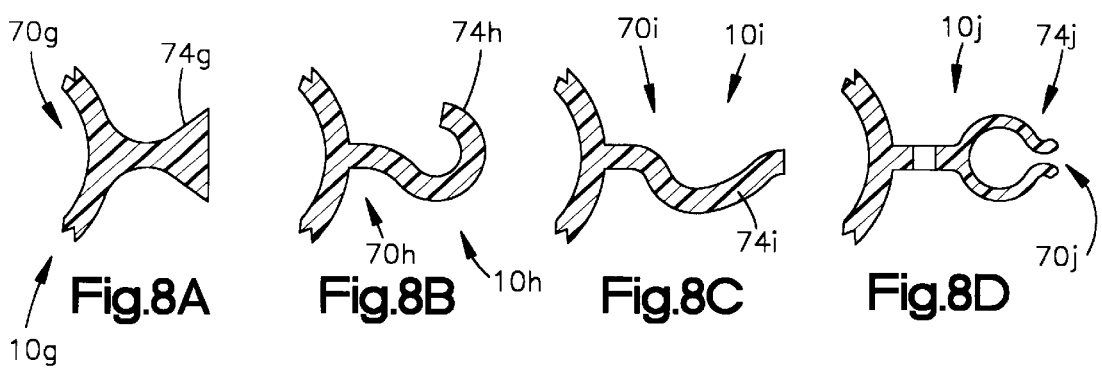

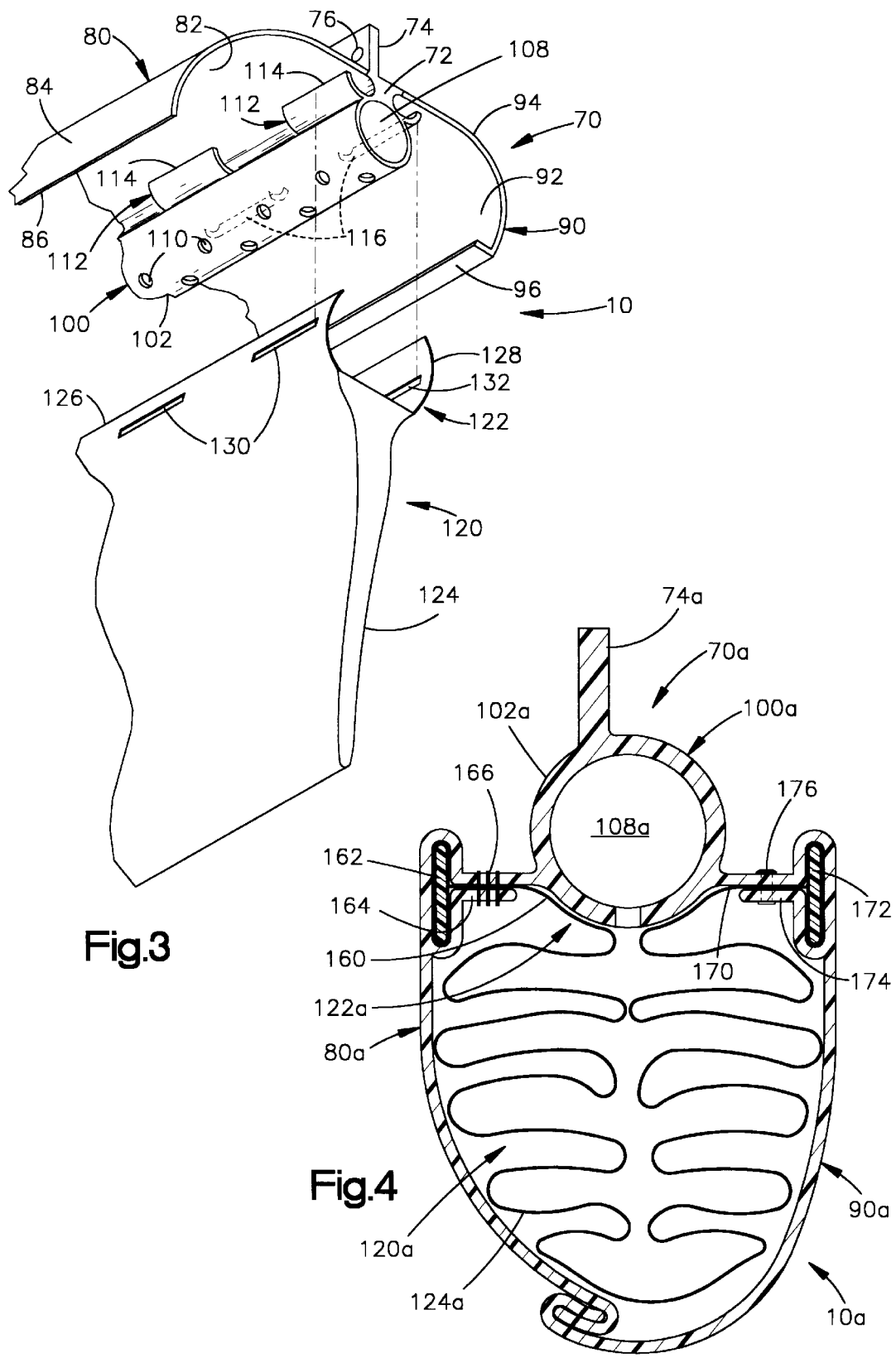

VEHICLE INFLATABLE SIDE CURTAIN ASSEMBLY

BACKGROUND OF THE INVENTION

1. Technical Field

The present invention relates to a vehicle safety apparatus. In particular, the present invention relates to an inflatable vehicle occupant protection device, such as a side curtain, for helping to protect an occupant of a vehicle in the event of a side impact to the vehicle.

2. Description of the Prior Art

It is known to inflate an air bag to help protect a vehicle occupant in the event of a vehicle collision. Some vehicles include an air bag in the form of a side curtain which is inflatable downward adjacent the side structure of the vehicle to help protect a vehicle occupant in the event of a side impact to the vehicle.

The side curtain is typically stored in a deflated condition along the roof rail above the side windows of the vehicle. The side curtain is part of a module attached to the sheet metal of the vehicle. The side curtain is covered with a trim panel or cover which may be part of the module or separate from the module. The module typically includes a fill tube for directing inflation fluid into the side curtain.

SUMMARY OF THE INVENTION

The present invention is a vehicle occupant safety apparatus for helping to protect an occupant of a vehicle having a roof and a side structure. The apparatus comprises an inflatable vehicle occupant protection device having a deflated condition and having an inflated condition in which the protection device is inflated between the occupant and the vehicle side structure. The apparatus also comprises a one-piece extruded cover for mounting in the vehicle in a position extending along the vehicle between the roof and side structure. The cover includes a diffuser chamber extending along the length of the cover for receiving inflation fluid to inflate the inflatable device. The cover includes an inflatable device chamber extending parallel to the diffuser chamber along the length of the cover. The inflatable device chamber receives the inflatable device in a deflated condition. The cover has a plurality of diffuser openings spaced along the length of the diffuser chamber and establishing fluid communication between the diffuser chamber and the inflatable device chamber when the inflatable device is in the deflated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic side view of a portion of a vehicle including a safety apparatus constructed in accordance with the present invention;

FIG. 3 is an exploded perspective view of parts of the safety apparatus of FIG. 1;

FIGS. 4–6 are sectional views showing alternative structures for attaching the side curtain;

FIGS. 7A–7C are sectional views showing alternative closure structures for a safety apparatus in accordance with the invention; and FIGS. 8A–8D are sectional views showing alternative mounting structures for a safety apparatus in accordance with the invention.

DESCRIPTION OF PREFERRED EMBODIMENTS

Figure 2:
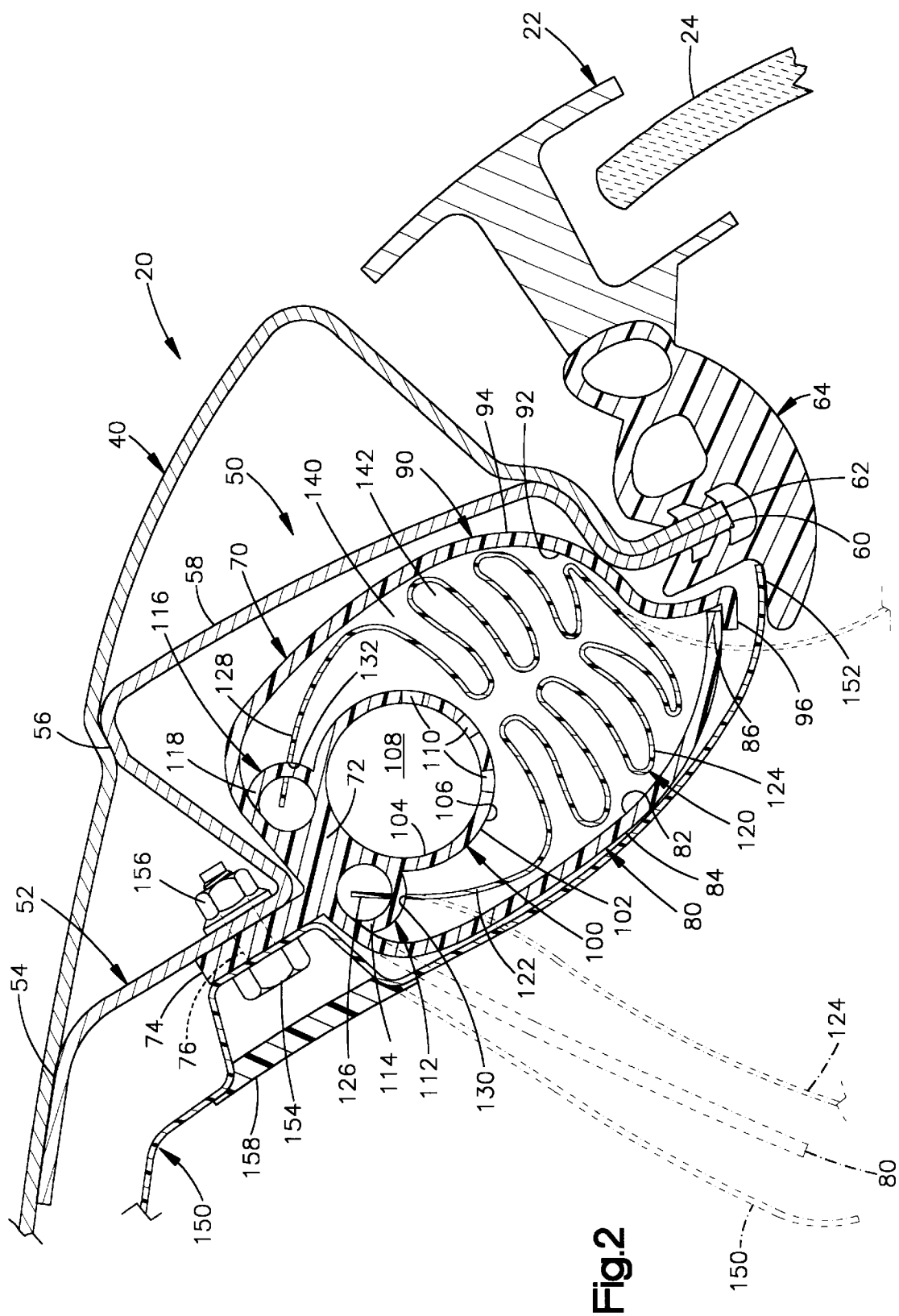
FIG. 2 is a sectional view of the vehicle safety apparatus of FIG. 1, taken generally along line 2—2 of FIG. 1, including a side curtain shown in a deflated condition and, in dot-dash lines, in an inflated condition.

The present invention relates to a vehicle safety apparatus. In particular, the present invention relates to an inflatable vehicle occupant protection device, such as a side curtain, for helping to protect a vehicle occupant in the event of a side impact to a vehicle. As representative of the present invention, FIG. 1 illustrates schematically a vehicle safety apparatus 10 for helping to protect an occupant of a vehicle 12.

The vehicle 12 has a side structure 20 (FIGS. 1–2) which includes a front door 22 and a front side window 24. The vehicle side structure 20 also includes a rear door 26 and a rear side window 28. The vehicle B-pillar 30 is disposed between the front side window 24 and the rear side window 28. The side structure 20 also includes the vehicle A-pillar 32 and C-pillar 34.

An inflator 14 is mounted adjacent the C-pillar 34 of the vehicle 12. The inflator 14 preferably contains a stored quantity of pressurized inflation fluid in the form of gas. The inflator alternatively could contain a combination of pressurized inflation fluid and ignitable material for heating the inflation fluid, or could be a pyrotechnic inflator which uses the combustion of gas-generating material to generate inflation fluid.

A metal roof panel 40 of the vehicle 12 extends laterally in the vehicle, from the vehicle side structure 20 past the vehicle centerline. When a vehicle occupant sits in the front seat 42 of the vehicle 12, the occupant is adjacent to the vehicle front door 22 and front window 24. The side of the occupant's head is adjacent to the front window 24. The top of the occupant's head is adjacent to the roof panel 40.

The vehicle side structure 20 (FIG. 2) includes a metal support rail 50 adjacent to and inside the roof panel 40. A V-shaped inner section 52 of the support rail 50 is welded to the roof panel 40 at two locations 54 and 56. A main leg 58 of the support rail 50 extends downward and outward from the inner section 52. An outer edge portion 60 of the support rail 50 overlies and is welded to an outer edge portion 62 of the roof panel 40.

The vehicle side structure 20 also includes a window seal or bulb seal 64 which is supported on the outer edge portion 62 of the roof panel 40 and the outer edge portion 60 of the support rail 50. The vehicle front door 22, which supports the front side window 24, is engageable with the bulb seal 64 when the door is closed.

The safety apparatus 10 includes a cover 70 (FIGS. 2 and 3). The cover 70 is continuously extruded as one piece from a plastic material. The cover 70 is made from a material which is strong enough to protect the parts of the vehicle safety apparatus 10 which are enclosed within the cover. The material of the cover 70 is soft enough, that is, sufficiently flexible or deformable, to be opened by inflation of a side curtain 120 contained within the cover. One suitable type of material for the cover 70 is polypropylene.

The cover 70 has a central body portion 72. A mounting flange 74 projects from the central body portion 72. The mounting flange 74 has a rectangular cross-sectional configuration. A plurality of fastener openings 76 are formed in the mounting flange 74.

The cover 70 includes an inner cover flap 80 and an outer cover flap 90. The cover flaps 80 and 90 extend from the central body portion 72 in directions away from the mounting flange 74 and from each other. The cover flaps 80 and 90 extend for substantially the entire length of the cover 70.

The inner cover flap 80 has an inner side surface 82 and an outer side surface 84. The inner cover flap has a straight terminal edge portion 86 along its edge opposite the central body portion 72. The outer cover flap 90 has an inner side surface 92 and an outer side surface 94. The outer cover flap has a V-shaped terminal edge portion 96 along its edge opposite the central body portion 72.

The cover flaps 80 and 90, when extruded as part of the cover 70, have a curved configuration as seen in FIG. 3. The cover flaps 80 and 90 are resiliently movable to the closed configuration shown in solid lines in FIG. 2.

The cover 70 includes a diffuser 100 which extends downward (as viewed in FIGS. 2 and 3) from the central body portion 72 of the cover, between the flaps 80 and 90. The diffuser 100 has an elongate, tubular configuration and extends for substantially the entire length of the cover. The diffuser 100 includes a diffuser wall 102 having parallel, generally cylindrical, inner and outer side surfaces 104 and 106. The inner side surface 104 of the diffuser wall 102 defines a fluid flow passage or diffuser chamber 108 in the diffuser.

The diffuser 100 includes a plurality of inflation fluid outlets 110. The inflation fluid outlets 110 are openings in the diffuser wall 102 which extend radially between the inner and outer side surfaces 104 and 106 of the diffuser wall. The inflation fluid outlets 110 are spaced along the length of the diffuser 100 and are presented generally away from the central body portion 72 of the cover 70. The inflation fluid outlets 110 are open at all times during use of the cover 70.

The cover 70 includes two sets of side curtain attachment hooks formed on the diffuser 100. A set of inner hooks 112 is located on the side of the diffuser 100 adjacent the inner cover flap 80. Each one of the inner hooks 112 has a distal end portion 114. A set of outer hooks 116 is located on the side of the diffuser 100 adjacent the outer cover flap 90. Each one of the outer hooks 116 has a distal end portion 118.

The hooks 112 and 116, as part of the cover 70, are formed as one piece with the diffuser 100, the mounting flange 74, and the cover flaps 80 and 90. The cover 70 is initially extruded with channels or flanges which are then cut away at equally spaced locations to form the hooks 112 and 116.

The side curtain 120 (FIGS. 2 and 3) has a mounting portion 122 and an occupant contact portion 124. The mounting portion 122 includes inner and outer flaps 126 and 128.

A plurality of slots 130 are formed in the inner flap 126 of the side curtain 120. Each one of the inner slots 130 is configured to accept one of the inner curtain attachment hooks 112 of the cover 70. A plurality of slots 132 are formed in the outer flap 128 of the side curtain 120. Each one of the outer slots 132 is configured to accept one of the outer curtain attachment hooks 116 of the cover 70.

The side curtain 120 is attached to the cover 70 at a time when the inner and outer cover flaps are in a open condition as shown in FIG. 3. The terminal edge portion 86 of the inner cover flap 80 is spaced apart from the terminal edge portion 96 of the outer cover flap 90 to enable installation of the side curtain 120 to the cover 70.

The inner curtain attachment hooks 112 are inserted into the inner slots 130 in the inner flap 126 of the side curtain 120. The outer curtain attachment hooks 116 are inserted into the outer slots 132 in the outer flap 128 of the side curtain 120.

The hooks 112 and 116 are then bent over and heat staked to the cover 70. Specifically, the inner hooks 112 are bent over so that their end portions 114 engage the inner side surface 82 of the inner cover flap 80. Heat is applied to fuse the end portions 114 of the inner hooks 112 to the inner cover flap 80. In a similar manner, the outer hooks 116 are bent over so that their end portions 118 engage the inner side surface 92 of the outer cover flap 90. Heat is applied to fuse the end portions 118 of the outer hooks 116 to the outer cover flap 90.

After the mounting portion 122 of the side curtain 120 is attached to the cover 70 in this manner, the cover flaps 80 and 90 are then closed about the occupant contact portion 124 of the side curtain. The terminal edge portion 86 of the inner cover flap 80 is releasably caught within the V-shaped terminal edge portion 96 of the outer cover flap 90.

The cover flaps 80 and 90 and the central body portion 72 of the cover 70 define an inflatable device chamber 140 in the cover. The inflatable device chamber 140 extends parallel to the diffuser 100 and the diffuser chamber 108 along the length of the cover 70. The hooks 112 and 116 are disposed within the inflatable device chamber 108.

Both the occupant contact portion 124 of the side curtain 120 and the mounting portion 122 of the side curtain are disposed in the inflatable device chamber 140 in the cover 70. The occupant contact portion 124 of the side curtain 120 extends circumferentially around the diffuser 100. The diffuser 100 extends longitudinally along the occupant contact portion 124 of the side curtain 120.

The occupant contact portion 124 of the side curtain 120 defines an inflation fluid volume 142 in the side curtain. The inflation fluid outlets 110 in the diffuser 100 establish fluid communication between the inflation fluid volume 142 in the side curtain 120 and the diffuser chamber 108 in the diffuser 100.

The vehicle 12 includes a headliner 150 (FIG. 2) for covering the inside of the roof panel 40 and the safety apparatus 10. The headliner 150 has a terminal edge portion 152 which is laterally outermost in the vehicle 12, closest to the vehicle side structure 20. The outer edge portion 152 of the headliner 150 is received under the bulb seal 64.

The safety apparatus 10, including the side curtain 120 (in its deflated condition) and the cover 70, is stored in the vehicle 12 between the headliner 150 and the support rail 50. A plurality of fasteners in the form of bolts 154, spaced along the length of the safety apparatus 10, secure the safety apparatus to the support rail 50. The bolts 154 extend through the fastener openings 76 in the mounting flange 74 of the cover 70 and are screwed into nuts 156 welded to the support rail 50. The fasteners 154 also secure the headliner 152 to the support rail 50. The heads of the fasteners 154 are covered by headliner plugs 158.

The vehicle 12 includes electric circuitry (not shown) including a sensor for sensing a vehicle condition such as a side impact to the vehicle or a vehicle rollover condition. The electric circuitry also includes a controller for actuating the inflator 14 in response to the output of the sensor. Upon the occurrence of a vehicle condition for which inflation of the side curtain 120 is desired to help protect the occupant of the vehicle 12, the sensor and the controller cooperate to send an actuation signal to the inflator 14.

The inflator 14 is actuated and inflation fluid is directed from the inflator into the diffuser chamber 108 in the diffuser 100. Inflation fluid is received directly in the diffuser 100 and contacts the inner side surface 104 of the diffuser wall 102. The safety apparatus 10 does not include a separate fill tube within the side curtain 120 or the cover 70.

Inflation fluid flows out of the diffuser 100, through the inflation fluid outlets 110, into the side curtain 120. The pressure of the inflation fluid begins to inflate the occupant contact portion 124 of the side curtain 120. The inflating side curtain 120 presses outwardly on the inner and outer cover flaps 80 and 90. The force applied to the inner cover flap 80 causes it to move out of engagement with the outer cover flap 90. The inner cover flap 80 presses against the headliner 150 and pulls the terminal edge portion 152 of the headliner out from under the bulb seal 64.

The occupant contact portion 124 of the side curtain 120 inflates into the vehicle occupant compartment, as shown in dot-dash lines in FIG. 2. The side curtain 120 inflates generally vertically downward in the vehicle 12, adjacent the side structure 20 of the vehicle, to help protect an occupant of the vehicle. The material, thickness and size of the hooks 112 and 116 are selected to ensure that the side curtain 120 does not pull away from the cover 70 when the side curtain is inflated.

FIG. 4 illustrates portions of a safety apparatus 10*a* constructed in accordance with a second embodiment of the present invention. The safety apparatus 10*a* is generally similar in construction to the safety apparatus 10 (FIGS. 1–3), and parts which are the same or similar are given the same reference numerals with the suffix "a" added for clarity.

Illustrated in FIG. 4 is a cover 90*a* which embodies two different methods for attaching the mounting portion 122*a* of the side curtain 120*a* to the cover. It should be understood that only one of these alternative attachment methods would be used in any one safety apparatus 10*a* constructed in accordance with the invention. One mounting portion 160 of the side curtain 120*a* is wrapped around a welt 162. A curtain attachment flap 164 of the cover 70*a* is bent around the welt 162 and stitched to the cover flap 80*a* with a stitching section 166.

On the opposite side of the central body portion of the cover 80*a*, another mounting portion 170 of the side curtain 120*a* is wrapped around a welt 172. A curtain attachment flap 174 of the cover 70*a* is secured to the cover flap 90*a* with a rivet 176.

Figure 5:
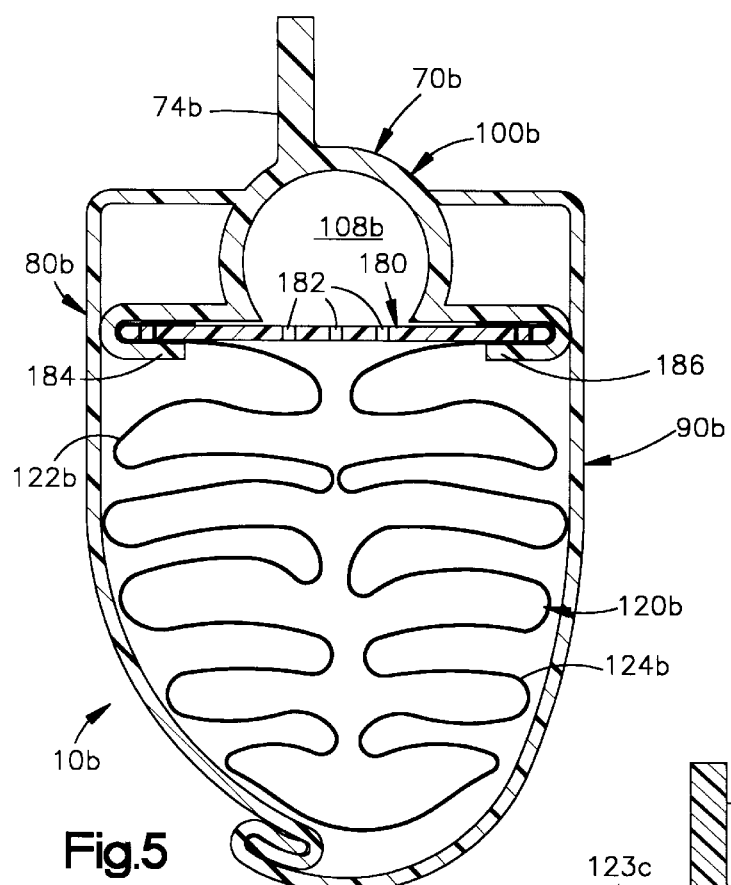

FIG. 5 illustrates portions of a safety apparatus 10*b* constructed in accordance with a third embodiment of the present invention. The safety apparatus 10*b* is generally similar in construction to the safety apparatus 10 (FIGS. 1–3), and parts which are the same or similar are given the same reference numerals with the suffix "b" added for clarity.

The safety apparatus 10*b* embodies a further method for attaching a mounting portion 122*b* of a side curtain 120*b* to a cover 70*b*. In the safety apparatus 10*b*, the mounting portion 122*b* of the side curtain 120*b* is sewn to a plastic diffuser plate 180 having a series of inflation fluid openings 182. The opposite ends of the diffuser plate are captured between parallel legs 184 and 186 of the cover 70*b*. The diffuser plate 180 is preferably inserted in the cover 70*b* by openings the legs 184 and 186 of the mounting portion, inserting the diffuser plate, then allowing the legs to snap back into the closed condition shown in FIG. 5.

Figure 6:
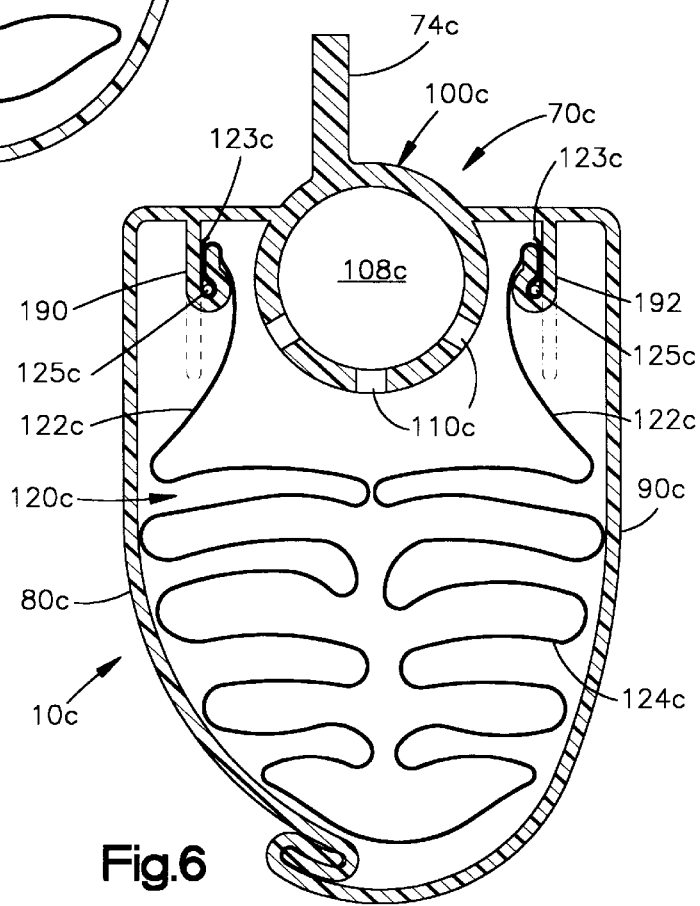

FIG. 6 illustrates portions of a safety apparatus 10*c* constructed in accordance with a fourth embodiment of the present invention. The safety apparatus 10*c* is generally similar in construction to the safety apparatus 10 (FIGS. 1–3), and parts which are the same or similar are given the same reference numerals with the suffix "c" added for clarity.

The safety apparatus 10*c* illustrated in FIG. 4 includes a cover 70*c* having elongate, parallel mounting tabs 190 and 192 extruded on opposite sides of the diffuser 100*c*. Each one of the mounting tabs 190 and 192 is initially formed in an open condition as shown in dot-dash lines in FIG. 6. A mounting portion 122*c* of the side curtain 120*c* has end portions 123*c* extending around support rods 125*d*. Each one of the mounting tabs 190 and 192 is heated and bent over to pinch an end portion 123*c* and support rod 125*c*. The cover 70*c* is then allowed to cool. The mounting tabs 190 and 192 cool in the position shown in solid lines in FIG. 6. In this position, they retain the mounting portion 122*c* of the side curtain 120*c* on the cover 70*c*.

FIGS. 7A–7C are sectional views showing alternative closure portions for cover flaps of safety apparatus in accordance with the invention. In FIG. 7A, the outer edge portion 96*d* of one cover flap 90*d* is formed with a cylindrical internal channel. The outer edge portion 86*d* of the other cover flap 80*d* is formed as a cylindrical rib which is releasably received inside the channel.

In FIG. 7B, the outer edge portion 96*e* of one cover flap 90*e* is formed with an internal channel having a plurality of non-parallel, linear side surfaces. The outer edge portion of the other cover flap 80*e* is formed with a complementary shaped rib 86*e* which is releasably received inside the channel. In FIG. 7C, the outer edge portions 86*f* and 96*f* of cover flaps 80*f* and 90*f* are folded and overlapped to releasably secure together the cover flaps.

FIGS. 8A–8D are sectional views showing alternative cover mounting portions for safety apparatus in accordance with the invention. In FIG. 8A, the mounting portion 74*g* of the cover has a dovetail configuration adapted to fit between opposing surfaces of the vehicle side structure (not shown) to retain the cover in place in the vehicle.

In FIG. 8B, the mounting portion 74*h* of the cover 70*h* has a hooked configuration adapted to hook into the vehicle side structure (not shown) to retain the cover in place in the vehicle.

In FIG. 8C, the mounting portion 74*i* of the cover 70*i* has an S-shaped configuration adapted to be captured between opposing surfaces on the vehicle side structure (not shown) to retain the cover in place in the vehicle. In FIG. 8D, the mounting portion 74*j* of the cover 70*j* is configured as a "C" clip adapted to hook over a portion of the vehicle side structure (not shown) to retain the cover in place in the vehicle.

From the above description of the invention, those skilled in the art will perceive improvements, changes and modifications in the invention. Such improvements, changes and modifications within the skill of the art are intended to be covered by the appended claims.

Having described the invention we claim:

1. A vehicle occupant safety apparatus for helping to protect an occupant of a vehicle having a roof and a side structure comprising:

an inflatable vehicle occupant protection device having a deflated condition and having an inflated condition in which said protection device is inflated between the occupant and the vehicle side structure; and a one-piece extruded cover for mounting in the vehicle in a position extending along the vehicle between the roof and side structure;

said cover including a diffuser chamber extending along the length of said cover for receiving inflation fluid to inflate said inflatable device;

said cover including an inflatable device chamber extending parallel to said diffuser chamber along the length of said cover, said inflatable device chamber receiving said inflatable device in a deflated condition; and said cover having a plurality of diffuser openings spaced along the length of said diffuser chamber and establishing fluid communication between said diffuser chamber and said inflatable device chamber when said inflatable device is in the deflated condition.

2. An apparatus as set forth in claim 1 further comprising an inflator for inflating said inflatable device, and wherein said cover includes an attachment portion for securing said inflatable device to said cover in said inflatable device chamber at a location spaced apart from said inflator.

3. An apparatus as set forth in claim 2 wherein said cover includes an attachment portion for securing said inflatable device to said cover, said attachment portion comprising a plurality of hooks extendable through openings in said inflatable device.

4. An apparatus as set forth in claim 3 wherein said hooks are disposed in said inflatable device chamber in said cover.

5. An apparatus as set forth in claim 3 wherein said hooks are heat staked to a portion of said cover to secure said inflatable device to said cover.

6. An apparatus as set forth in claim 2 wherein said attachment portion comprises a plurality of flanges which are bent around a mounting portion of said inflatable device to secure said inflatable device to said cover.

7. An apparatus as set forth in claim 1 wherein said inflatable device is fixed to a diffuser plate separate from said cover, said attachment portion of said cover comprising a plurality of flanges which are bent around said diffuser plate to secure said inflatable device to said cover.

8. An apparatus as set forth in claim 1 wherein said cover comprises two cover parts relatively movable from a closed condition to an open condition because of inflation of said protection device to enable movement of said protection device out of said inflatable device chamber into the inflated condition between the occupant and the vehicle side structure.

9. An apparatus as set forth in claim 8 wherein said two cover parts have respective closing portions engageable with each other for releasably closing said cover with said inflatable device inside the inflatable device chamber.

10. An apparatus as set forth in claim 1 wherein said diffuser chamber has an elongate generally cylindrical configuration extending parallel to said inflatable device chamber.

11. An apparatus as set forth in claim 1 wherein said diffuser chamber is defined by a cylindrical surface of said extruded cover which is contacted by inflation fluid flowing through said diffuser chamber.

12. An apparatus as set forth in claim 1 wherein said cover comprises a mounting flange projecting from said diffuser in a direction away from said inflatable device chamber.

* * * * *